United States Patent
Lien et al.

(10) Patent No.: US 8,542,873 B2
(45) Date of Patent: Sep. 24, 2013

(54) MOTION OBJECT DETECTION METHOD USING ADAPTIVE BACKGROUND MODEL AND COMPUTER-READABLE STORAGE MEDIUM

(75) Inventors: Jenn-Jier Lien, Kaohsiung (TW); Chi-Chen Wang, Tainan County (TW); Te-Hsun Wang, Tainan (TW); Jin-Yi Wu, Taichung County (TW); Chien-Chung Tseng, Kaohsiung County (TW); Chih-Wei Fang, Tainan (TW)

(73) Assignee: Visionatics Inc., Tainan (TW)

( * ) Notice: Subject to any disclaimer, the term of this patent is extended or adjusted under 35 U.S.C. 154(b) by 773 days.

(21) Appl. No.: 12/621,520

(22) Filed: Nov. 19, 2009

(65) Prior Publication Data
US 2010/0296698 A1    Nov. 25, 2010

(30) Foreign Application Priority Data
May 25, 2009  (TW) ................................ 98117347 A

(51) Int. Cl.
*G06K 9/00*    (2006.01)
(52) U.S. Cl.
USPC ......................................................... 382/103
(58) Field of Classification Search
None
See application file for complete search history.

(56) References Cited

U.S. PATENT DOCUMENTS

| 2005/0074158 | A1* | 4/2005 | Kaufhold et al. | 382/132 |
| 2006/0262129 | A1* | 11/2006 | Tang et al. | 345/589 |
| 2008/0152236 | A1* | 6/2008 | Vendrig et al. | 382/224 |
| 2010/0296698 | A1* | 11/2010 | Lien et al. | 382/103 |

OTHER PUBLICATIONS

Stolkin (Stolkin, "Continuous Machine Learning in Computer Vision—Tracking with Adaptive Class Models", pp. 265-282, Scene Reconstruction, Pose Estimation and Tracking, Book edited by: Rustam Stolkin, ISBN 978-3-902613-06-6, pp. 530, I-Tech, Vienna, Austria, Jun. 2007).*
Moving Object Detection Based on Adaptive Background Model; Wang Chen-yang, Zhou Ming-quan, Geng Guo-hua, Computer Technology and Development; vol. 17 No. 4; pp. 21-24, Apr. 2007.

* cited by examiner

*Primary Examiner* — Brian P Werner
*Assistant Examiner* — Tahmina Ansari
(74) *Attorney, Agent, or Firm* — CKC & Partners Co., Ltd.

(57) ABSTRACT

A motion object detection method using an adaptive background model and a computer-readable storage medium are provided. In the motion object detection method, a background model establishing step is firstly performed to establish a background model to provide a plurality of background brightness reference values. Then, a foreground object detecting step is performed to use the background model to detect foreground objects. In the background model establishing step, a plurality of brightness weight values are firstly provided in accordance with the brightness of background pixels, wherein each of the brightness weight values is determined in accordance with the relative background pixel. Thereafter, the background brightness reference values are calculated based on the brightness of the background pixels and the brightness weight values. In addition, a computer can perform the motion object detection method after reading the computer-readable storage medium.

20 Claims, 12 Drawing Sheets

MOTION OBJECT DETECTION METHOD USING ADAPTIVE BACKGROUND MODEL AND COMPUTER-READABLE STORAGE MEDIUM

RELATED APPLICATIONS

This application claims priority to Taiwan Application Serial Number 98117347, filed May 25, 2009, which is herein incorporated by reference.

FIELD OF THE INVENTION

This invention relates to a motion object detection method using an adaptive background model and a computer-readable storage medium, and more particularly, to a motion object detection method using an adaptive background model and a computer-readable storage medium for a surveillance system.

BACKGROUND OF THE INVENTION

In a surveillance system, because the image data of the surveillance system occupies much storage capacity of the surveillance system, a motion object detection technology is developed for solving this problem. The motion object detection technology is be used to detect a foreground object in a surveillance image. The surveillance system adopting the motion object detection technology would not store surveillance image or send out warning messages until the foreground object is detected in the surveillance image.

In a conventional motion detection technology, a present image caught by a camera of the surveillance system is compared with a pre-build background model to get pixels having greater pixel value difference. Then, the pixels are converted to foreground objects. Thus, the surveillance system can determine when to store surveillance image or send out warning messages by estimate the state of the foreground objects.

However, the conventional motion detection technology cannot provide the background model in accordance with the change of the brightness of a surveillance area. Therefore, when the brightness of the surveillance area changes, the surveillance system cannot determine when to store surveillance image or send out warning messages.

SUMMARY OF THE INVENTION

An aspect of the present invention is to provide a motion object detection method using an adaptive background model to provide a background model in accordance with the change of the brightness of the surveillance area.

Another aspect of the present invention is to provide a computer-readable storage medium storing a computer program for controlling a computer to perform the motion object detection method.

According to an embodiment of the present invention, the motion object detection method using an adaptive background model detects a foreground object in a present image in accordance with at least one background image, wherein the present image and the background images are corresponding to the same pixel coordinate array comprising a plurality of pixel coordinates points. In the motion object detection method, a background model establishing step is firstly performed. Then, at least one foreground object are detected by using a plurality of background brightness reference values of the background model. In the background model establishing step, a plurality of first brightness weight values are firstly determined in accordance with the brightness of a plurality of background pixels of the background image, wherein each of the first brightness weight values corresponds to a background pixel, and each of the first brightness weight values is determined by the brightness of the corresponding background pixel. Then, a plurality of background brightness reference values are calculated in accordance with the brightness of the background pixels and the first brightness weight values, wherein each of the background brightness reference values corresponds to a pixel coordinates point.

According to another embodiment of the present invention, the motion object detection method using an adaptive background model detects a foreground object in a present image in accordance with at least one background image. In the motion object detection method, a background model is firstly established in accordance with at least one background image, wherein the background model includes a plurality of background brightness reference values. Then, it is determined that if a plurality of pixels of the present image are foreground pixels in accordance with the background model. Thereafter, at least one foreground object are detected in the present image in accordance with the pixels determined as foreground pixels. Then, it is determined that if the area of the at least one foreground object is greater than a background interference threshold. Thereafter, a quick background updating step is performed to update each of the background brightness reference values when the area of the at least one foreground object is greater than a background interference threshold. In the quick background updating step, a brightness weight value is firstly determined in accordance with the brightness of the pixel of the present image. Then, the background brightness reference value corresponding to the pixel is multiplied by the second brightness weight value to obtain a background brightness proportion value. Thereafter, a difference between 1 and the second brightness weight value is multiplied by the brightness of the pixel to obtain a foreground brightness proportion value. Then, the background brightness reference value corresponding to the pixel is updated to the sum of the foreground brightness proportion value and the background brightness proportion value.

According to further another embodiment of the present invention, the motion object detection method using an adaptive background model detects a foreground object in a present image in accordance with at least one background image. In the motion object detection method, a background model is firstly established in accordance with at least one background image, wherein the background model includes a plurality of background brightness reference values. Then, it is determined that if a plurality of pixels of the present image are foreground pixels in accordance with the background model. Thereafter, it is determined that if the number of the pixels determined as foreground pixels is greater than a background varying threshold. Thereafter, a quick background updating step is performed to update each of the background brightness reference values when the number of the pixels determined as foreground pixels is greater than a background varying threshold. In the quick background updating step, a brightness weight value is firstly determined in accordance with the brightness of the pixel of the present image. Then, the background brightness reference value corresponding to the pixel is multiplied by the second brightness weight value to obtain a background brightness proportion value. Thereafter, a difference between 1 and the second brightness weight value is multiplied by the brightness of the pixel to obtain a foreground brightness proportion value. Then, the background brightness reference value corresponding to the pixel is updated to the sum of the foreground brightness proportion value and the background brightness proportion value.

According to still another embodiment of the present invention, the motion object detection method using an adaptive background model detects a foreground object in a present image in accordance with at least one background image. In the motion object detection method, a background model establishing step is performed to use the at least one background images to establish a background model, wherein the background model includes a plurality of background brightness reference value. Then, it is determined that if a plurality of pixels of the present image are foreground pixels. Thereafter, at least one foreground object are detected in the present image in accordance with the pixels determined as foreground pixels. Then, a shadow filtering step is performed to filter off the shadow of the foreground object. In the shadow filtering step, the foreground object is firstly projected on a horizontal coordinate axis to obtain a pixels distribution curve. Then, an object substance proportion threshold is provided. Thereafter, a substance portion of the foreground object is determined in accordance with a maximum value of the pixels distribution curve.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In order to make the illustration of the present invention more explicit and complete, the following description is stated with reference to FIG. 1 through FIG. 12.

Figure 1:
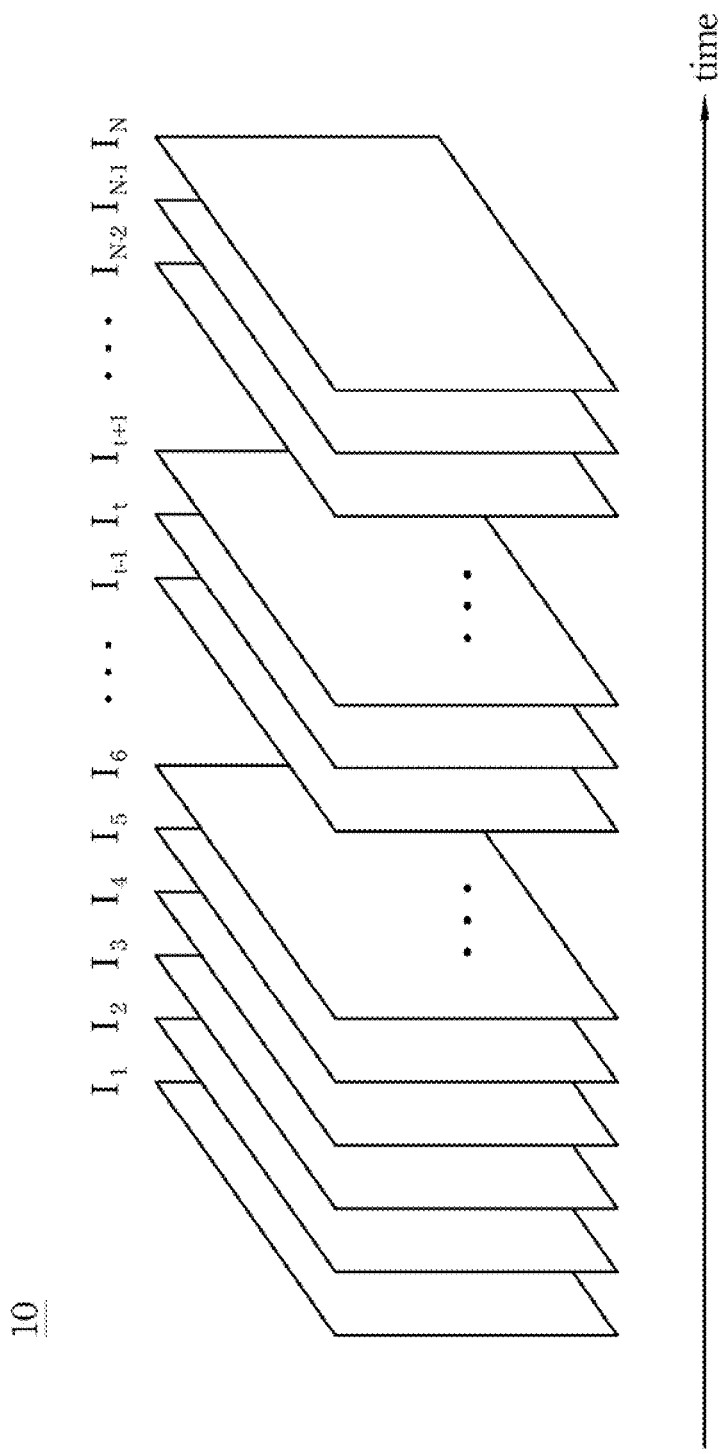
FIG. 1 is a diagram showing the structure of an image sequence caught by a surveillance system.
Figure 2:
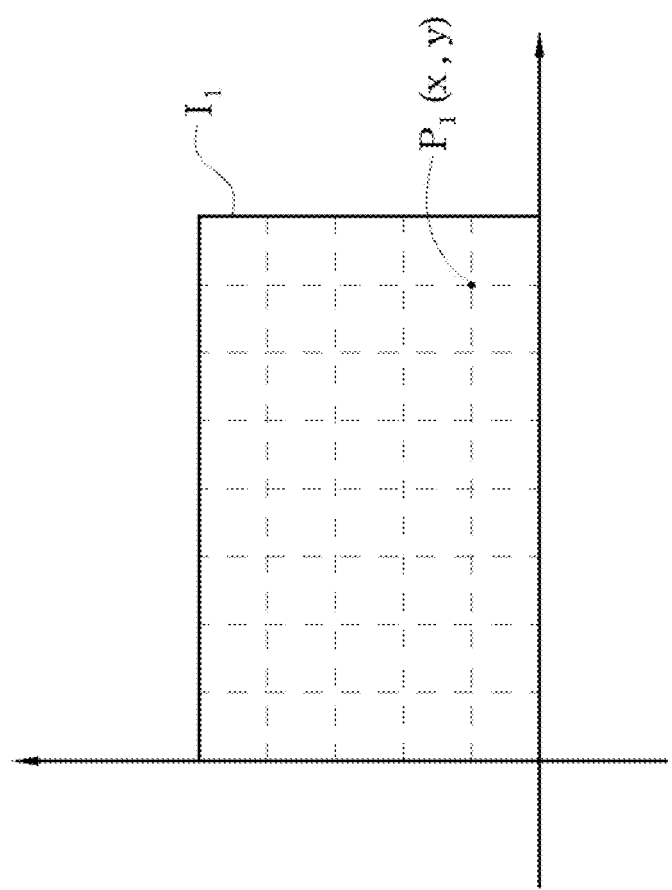
FIG. 2 is a diagram showing a coordinate matrix corresponding to the image sequence.

Refer to FIG. 1 and FIG. 2 simultaneously. FIG. 1 is a diagram showing the structure of an image sequence 10 caught by a surveillance system. FIG. 2 is a diagram showing a coordinate matrix 15 corresponding to the image sequence 10. The image sequence 10 includes a plurality of continuous images $I_1 \sim I_N$. All of the images correspond to the coordinate matrix 15. The coordinate matrix 15 includes a plurality of pixel coordinate points corresponding to all the pixels of each of the images in a one to one manner. In this embodiment, $P_j(x,y)$ is used to stand for the pixel, wherein (x,y) stands for the coordinate of the pixel and j stands for a frame number of the pixel, wherein j=1~N, and N is a natural number. As shown in FIG. 2, image $I_1$ corresponds to a x-y coordinate plane. All the pixels of the image $I_1$ can be expressed in the form of $P_1(x,y)$, and all of the coordinates of the pixels can form a coordinate matrix (such as the coordinate matrix 15) corresponding to all the images.

According to this embodiment of the present invention, the pixel includes a brightness portion, a first color portion, and a second color portion. The brightness portion, the first color portion, and the second color portion respectively correspond to the luma component and the chroma component of the YUV color space, the HSI color space, or the HSV color space. For example, the component H and S of the HSV color space respectively corresponds to the first color portion and the second color portion of the pixel, and the component V corresponds to the brightness portion of the pixel. In the following embodiments of the present invention, the brightness portion is taken as an example for explaining the embodiments, but it is noted that in other embodiments of the present invention the brightness portion, the first color portion, and the second color portion can be used together to perform the embodiments of the present invention.

Figure 3:
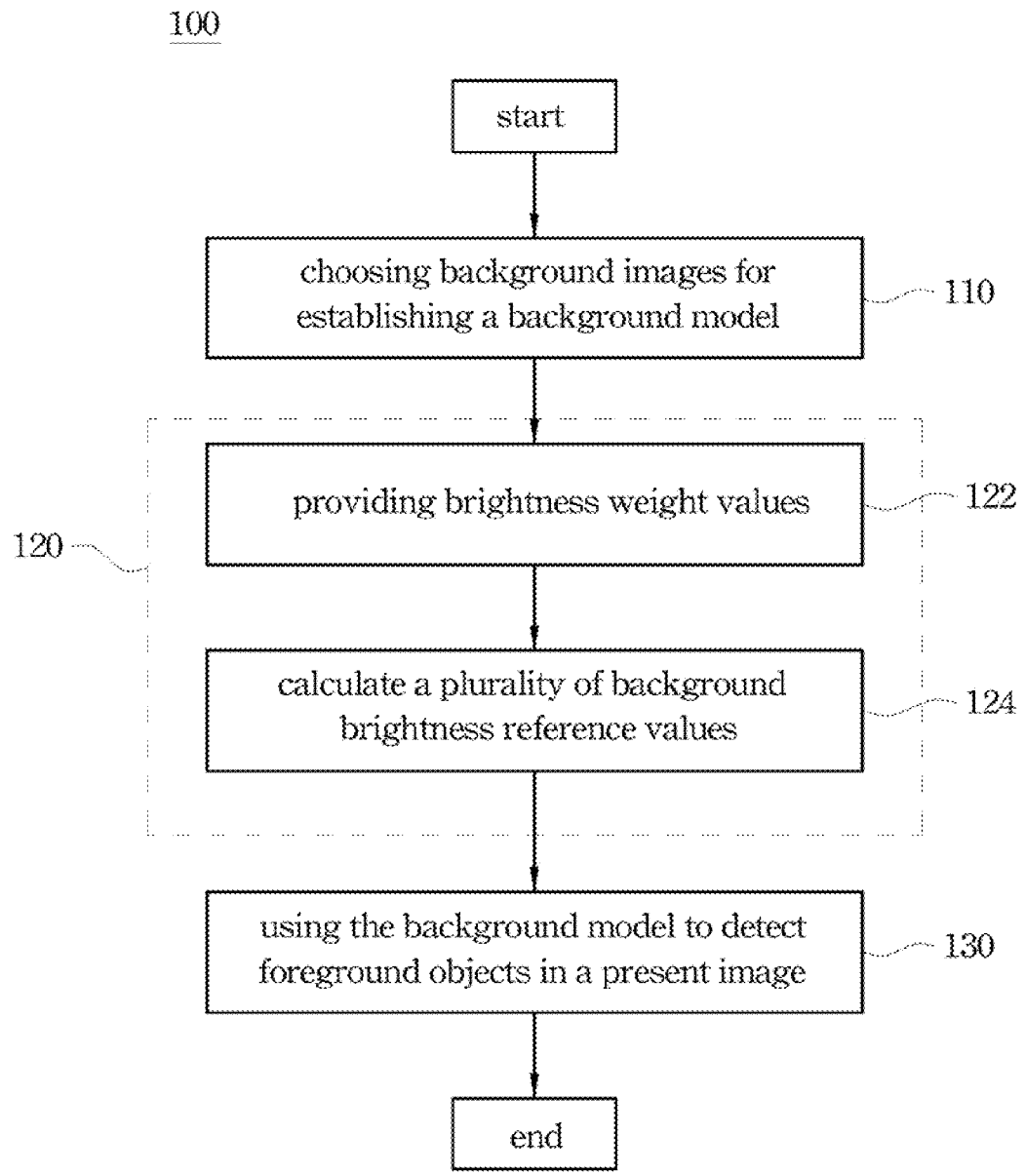
FIG. 3 is a flow chart showing a motion detection method according to an embodiment of the present invention.

Refer to FIG. 3. FIG. 3 is a flow chart showing a motion detection method 100 according to an embodiment of the present invention. In the motion detection method 100, a background image chosen step 110 is firstly performed to choose background images for establishing a background model. In this embodiment, the first 30 images $I_1 \sim I_{30}$ are chosen as the background images. However, in another embodiment of the present invention, the first one image can be chosen as the only one background image for establishing the background model.

Then, a background model establishing step 120 is performed to calculate background brightness reference values corresponding to the coordinate points and establish a background model, wherein each of the background brightness reference values corresponds one coordinate point. In the background model, each of the background pixels can be expressed by $P_M(x,y)$, wherein (x,y) stands for the coordinate of the background pixel, and the brightness of each of the background pixels is the background brightness reference value.

In the background model establishing step 120, a weight value providing step 122 is performed to provide brightness weight values W. Each of the brightness weight values W corresponds to one background pixel, and is determined by the brightness of the background pixel corresponding thereto. For example, in this embodiment, the maximum of a brightness range of the background pixel is set to 255 and the minimum of the brightness range of the background pixel is set to 0. The brightness range is divided into a plurality of sub-ranges, and each of the sub-ranges corresponds to a brightness value. The sub-range having a greater brightness average value corresponds to a greater weight value W, and the sub-range having a smaller brightness average value corresponds to a smaller weight value W. Thus, by determining the sub-range corresponding to each of the background pixels in accordance with the brightness thereof, the brightness weight values W corresponding to the background pixels are obtained.

Thereafter, a background brightness reference value calculating step 124 is performed to calculate a plurality of background brightness reference values in accordance with the brightness of the background pixels and the brightness weight values W corresponding thereto. In this embodiment, each of the brightness of the background pixels is multiplied by the brightness weight value W corresponding thereto to obtain a plurality of weighted brightness. Then, the weighted brightness is divided into a plurality of brightness groups in accordance with the coordinates thereof. For example, the weighted brightness according to the background pixels $P_1(1,1), P_2(1,1), \ldots, P_{30}(1,1)$ is arranged to a brightness group, and the weighted brightness according to the pixels $P_1(1,2), P_2(1,2), \ldots, P_{30}(1,2)$ is arranged to another brightness group, Thereafter, the average of each of the brightness groups is calculated to obtain a plurality of weighted average brightness. The average of each of the brightness groups is called as a weighted average brightness, and the weighted average brightness is used as the background brightness reference value. For example, the weighted average brightness of the background pixels $P_1(1,1), P_2(1,1), \ldots, P_{30}(1,1)$ is calculated to obtain the background brightness reference value corresponding to coordinate (1,1), and the weighted average brightness of the background pixels $P_1(1,2), P_2(1,2), \ldots, P_{30}(1,2)$ is calculated to obtain the background brightness reference value corresponding to coordinate (1,2). When the weighted average brightness corresponding to each of the coordinates is calculated, the background brightness reference value would be known, and the background model for the image $I_{31} \sim I_N$ can be established by using the background brightness reference values.

In other embodiments of the present invention, in the step 124, the median of each of the brightness group is calculated and used as the background brightness reference value. For example, the median of the brightness of the background pixels $P_1(1,1), P_2(1,2), \ldots, P_{30}(1,1)$ is calculated to obtain median corresponding to the coordinate (1,1), and the median of the brightness of the background pixels $P_1(1,2), P_2(1,2), \ldots, P_{30}(1,2)$ is calculated to obtain median corresponding to the coordinate (1,2). When the median corresponding each of the coordinates is calculated, the background brightness reference value would be known, and the background model for the image $I_{31} \sim I_N$ can be established by using the background brightness reference values. In addition, the first and last one in each of the brightness group can be abandoned at first. Then, the median of each of the brightness group is used as the background brightness reference value.

After the background model is established, a foreground object detection step 130 is performed to use the background model to detect foreground objects in a present image (such as $I_{31} \sim I_N$).

It is noted that, in other embodiments of the present invention, the brightness of each of the pixels in the image $I_1$ can be used as the background brightness reference value when only the image $I_1$ is used to for establishing the background model.

According to the aforementioned, the motion detection method 100 can be use to construct a proper background model in accordance with the brightness of the brightness of the surveillance area. Thus, a surveillance system using the method 100 would be more accurate in determining if something happens in the surveillance area.

Figure 4:
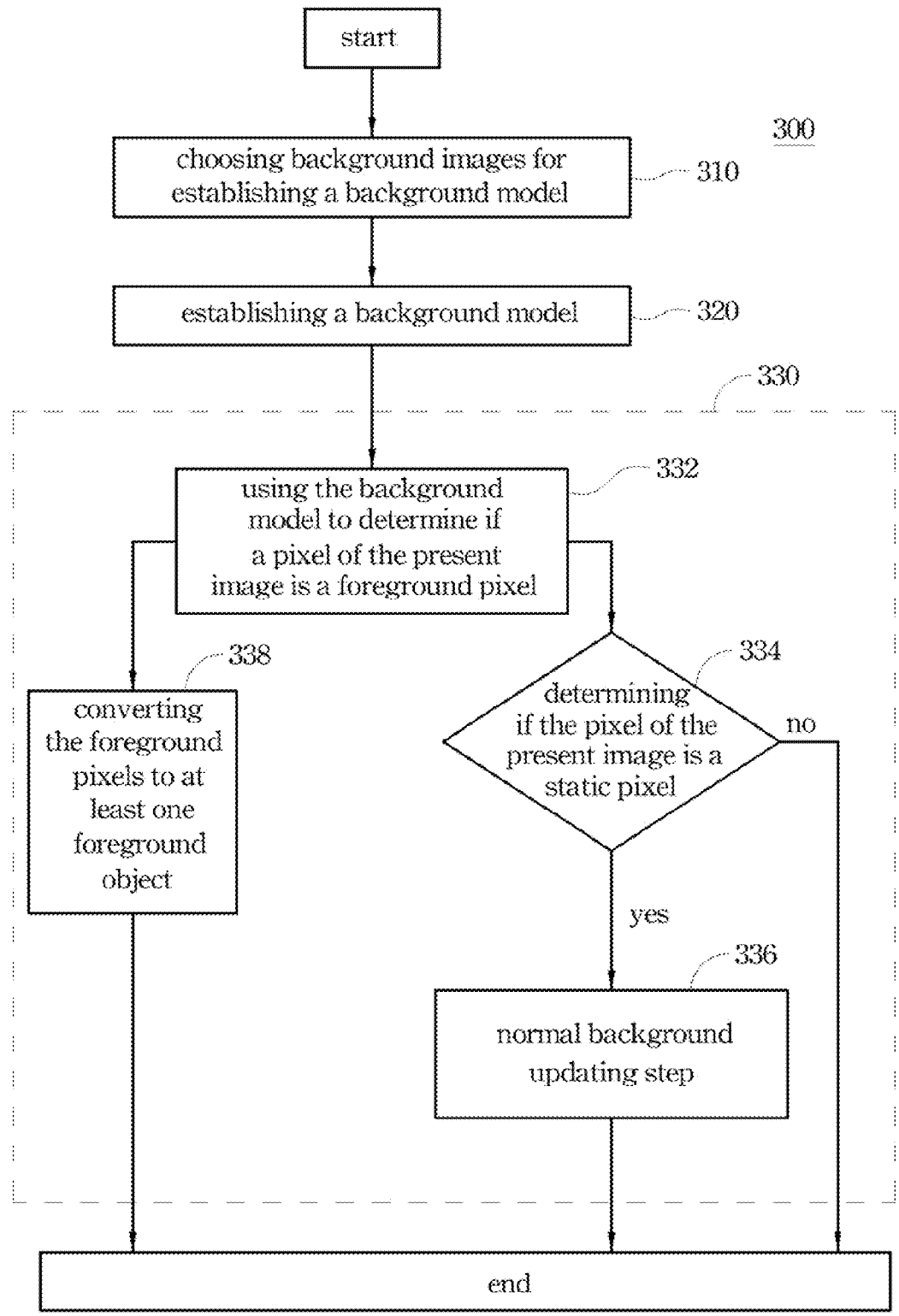
FIG. 4 is a flow chart showing a motion detection method according to an embodiment of the present invention.
Figure 5:
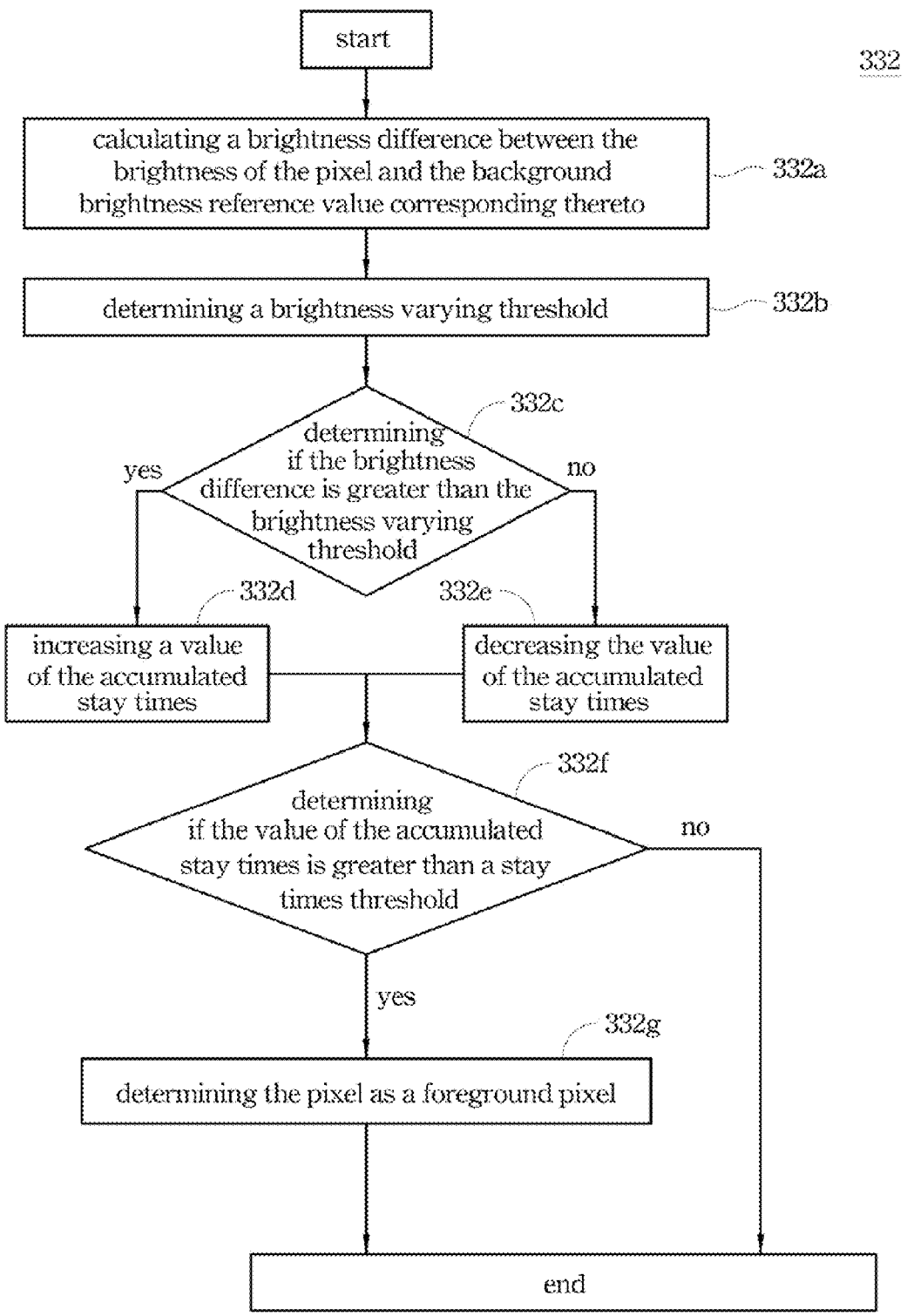
FIG. 5 is a flow chart showing a foreground object detection step of the motion detection method.
Figure 6:
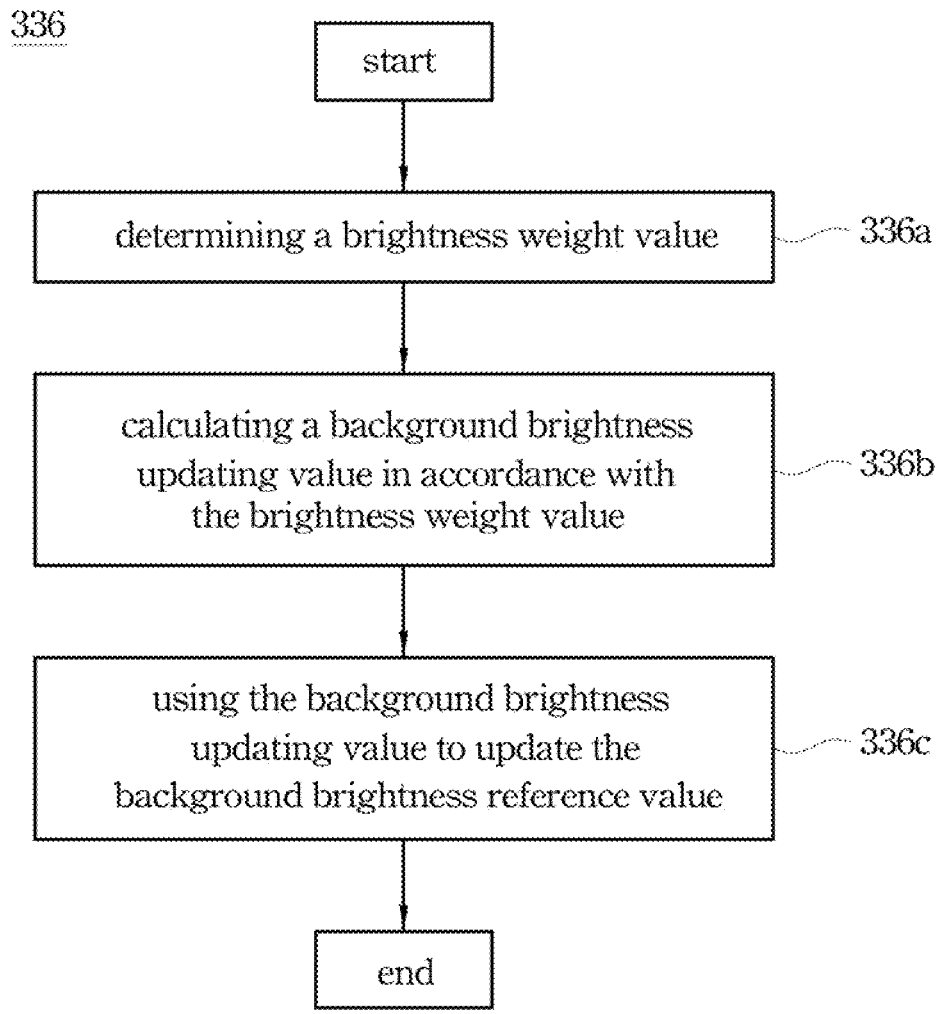
FIG. 6 is a flow chart showing a normal background updating step of the foreground object detection step.

Refer to FIG. 4 to FIG. 6. FIG. 4 is a flow chart showing a motion detection method 300 according to an embodiment of the present invention. FIG. 5 is a flow chart showing a foreground object detection step 330 of the motion detection method 300. FIG. 6 is a flow chart showing a normal background updating step 336 of the foreground object detection step 330. In the motion detection method 300, a step 310 is firstly performed to choose background images used for establishing a background model. Then, a background model establishing step 320 is performed to calculate the background brightness reference value corresponding to each of the coordinates of the background model. Thereafter, the foreground object detection step 330 is performed to detect foreground objects in the present image.

In the foreground object detection step 330, a foreground pixel determining step 332 is firstly performed to use the background model to determine if a pixel Px of the present image is a foreground pixel. Thereafter, a static pixel determination step 334 is performed to determine if the pixel Px of the present image is a static pixel. When the pixel Px is a static pixel, the normal background updating step 336 is performed to update the foreground brightness reference value to the brightness of the pixel Px, wherein the foreground brightness reference value corresponds to the same coordinate with the pixel Px. In addition, After all the pixels of the present image is processed by the step 332, a morphological processing step 338 is performed to convert the pixels determined as foreground pixels to at least one foreground object.

In the foreground pixel determination step 332, a brightness calculation step 332a is firstly performed to calculate a brightness difference between the brightness of the pixel Px and the background brightness reference value corresponding thereto. Thereafter, a step 332b is performed to determine a brightness varying threshold. In this embodiment, the brightness varying threshold is determined by the background brightness reference value corresponding thereto, wherein the brightness varying threshold is increased with the increasing of the background brightness reference value. In addition, the determination method used to determine the brightness weight value W can also be used to determine the brightness varying threshold. Then, a determination step 332c is performed to determine if the brightness difference is greater than the brightness varying threshold and provide a result. Then, the value of an accumulated stay times is determined in accordance with the result. For example, when the result is yes, a step 332d is performed to increase the value of the accumulated stay times corresponding to the coordinate of the pixel Px. However, when the result is no, a step 332e is performed to decrease the value of the accumulated stay times corresponding to the coordinate of the pixel Px. In this embodiment, a counter is used to record the accumulated stay times, and each of the coordinates corresponds one counter. Thereafter, a step 332f is performed to determine if the value of the accumulated stay times is greater than a stay times threshold $T_1$. When the value of the accumulated stay times is greater than the stay times threshold $T_1$, it means the pixel Px is static in a period of time. Thus, a step 332g is performed to determine the pixel Px as a foreground pixel. It is noted that, in this embodiment, the initial value of the accumulated stay times is 0 or a value smaller than the stay times threshold $T_1$.

Thereafter, in the following step 334, it is determined that if the foreground pixel Px keeps static too long by using the accumulated stay times. In this embodiment, the step 334 is performed to determine if the value of the accumulated stay times is greater than the value of another stay times threshold $T_2$ which is greater than the stay times threshold $T_1$. When the value of the accumulated stay times is greater than the value of the stay times threshold $T_2$, it means the pixel Px keeps static too long, so the pixel Px can be determined as a background pixel. Therefore, the normal background updating step 336 is performed to update the background model.

In the normal background updating step 336, a brightness weight value determination step 336a is firstly performed to determine a brightness weight value W' corresponding to each of the coordinate points of the coordinate matrix 15. In this embodiment, the brightness weight value W' is determined by the brightness of the pixel Px, wherein the brightness weight value is increased with the increasing of the brightness of the pixel Px. In addition, the determination method used to determine the brightness weight value W can also be used to determine the brightness weight value W'. Thereafter, a step 336b is performed to calculate a background brightness updating value in accordance with the brightness weight value W'. In this embodiment, the brightness weight value W' is multiplied by the background reference value corresponding to the pixel Px to obtain a background brightness proportion value. Then, a difference between 1 and the brightness weight value W' is multiplied by the brightness of the pixel Px to obtain a foreground brightness proportion value. Thereafter, the background brightness proportion value and the foreground brightness proportion value are summed up to obtain the background brightness updating value. Thereafter, a step 336c is performed to use the background brightness updating value to update the background brightness reference value corresponding to the pixel Px.

It is noted that, in this embodiment, the brightness weight value W' is substantially greater than or equal to 0.5 and smaller than 1, so that the variation of the background model can be kept in a proper range.

According to the aforementioned, in the motion detection method 300 of this embodiment, when a object staying in the surveillance area keeps static for a long time, the object would be considered as apart of the background, so that the surveillance using the method 300 would be more accurate in determining if something happens in the surveillance area. In addition, the motion detection 300 can filter off the shaking of small objects, such as leaves. Thus the small objects would not be determined as a foreground object. For example, a leaf usually performs a periodical action in a fixing area, so that the leaf would not be considered as a foreground object by properly setting the value of the accumulated stay times threshold $T_1$.

Figure 7:
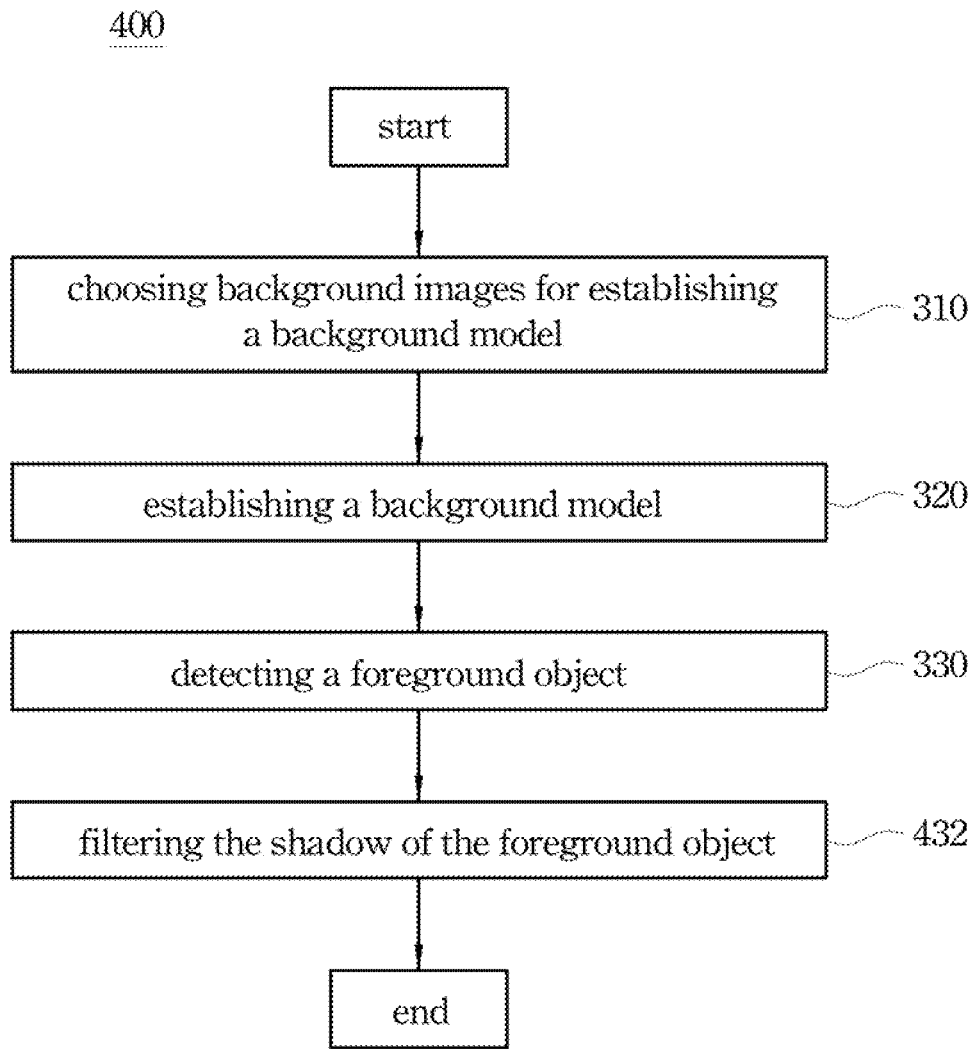
FIG. 7 is a flow chart showing a motion detection method according to an embodiment of the present invention.
Figure 8:
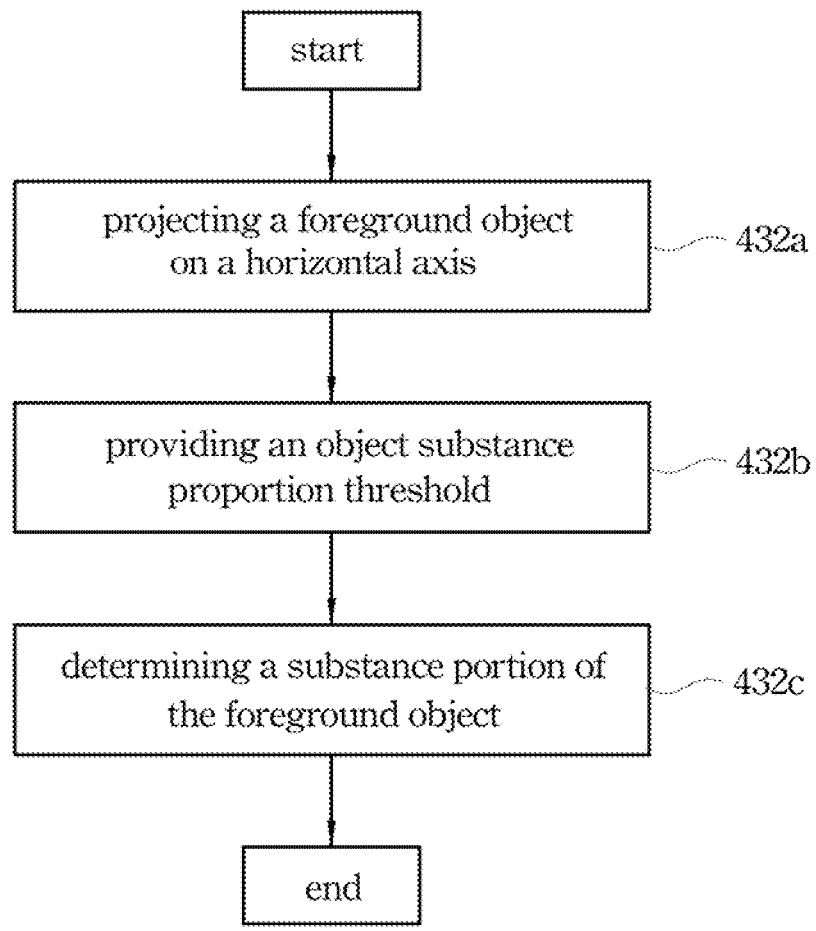
FIG. 8 is a flow chart showing a shadow filtering step of the motion detection method.

Refer to FIG. 7 and FIG. 8 simultaneously. FIG. 7 is a flow chart showing a motion detection method 400 according to an embodiment of the present invention. FIG. 8 is a flow chart showing a shadow filtering step 432 of the motion detection method 400. The motion detection method 400 is similar to the motion detection method 300, but the difference is in that the motion detection method 400 further includes the shadow filtering step 432.

In the shadow filtering step 432, a projecting step 432a is firstly performed to project a foreground object on a horizontal axis (such as x-axis) of the present image to obtain a pixel distribution curve which stands for the relationship between the pixels of the foreground object and the horizontal axis. Thereafter, a step 432b is performed to provide an object substance proportion threshold. Then, a step 432c is performed to determine a substance portion of the foreground object in accordance with the object substance proportion threshold and a maximum value of the pixels distribution curve. To explain the shadow filtering step 432 more clearly, an example is shown in the followings.

Figure 9:
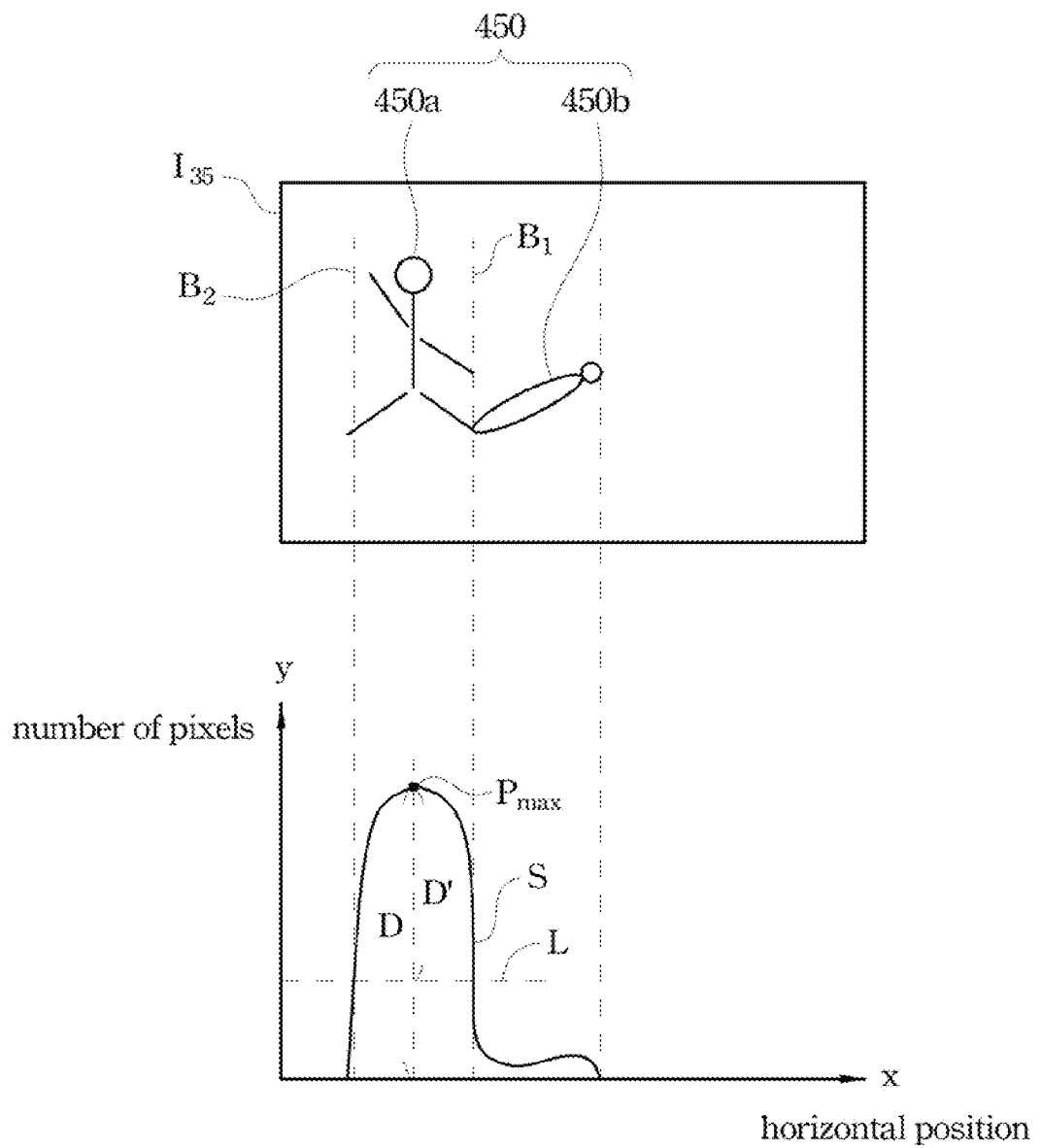
FIG. 9 is diagram showing a pixel distribution curve S of a present image.

Refer to FIG. 9. FIG. 9 is diagram showing a pixel distribution curve S of a present image $I_{35}$. The present image $I_{35}$ includes a foreground object 450, and the foreground object 450 includes a substance portion 450a and a shadow portion 450b. In the projecting step 432a, the relationship between the pixels of the foreground object 450 and the horizontal position of each of the pixels is plotted by the pixel distribution curve S, wherein the x-axis of FIG. 9 stands for the horizontal position of each of the pixels of the foreground object 450, and the y-axis of FIG. 9 stands for a pixel number of each of the horizontal positions on the x-axis. A distance between the horizontal axis and the point $P_{max}$ having a maximum pixel number is labeled by D. Then, a step 432b is performed to provide an object substance proportion threshold T. In this embodiment, the object substance proportion threshold T is set to 60%, but in other embodiments of the present invention, the object substance proportion threshold T can be set to a value between 50% and 70%. Thereafter, a step 432c is performed to determine a horizontal cutting line L. A distance between D' between the horizontal cutting line L and the point $P_{max}$ represents 60% of the distance D.

Thereafter, two boundary lines $B_1$ and $B_2$ can be determined in accordance with the intersection point of the cutting line L and the curve S. After the boundary lines $B_1$ and $B_2$ are determined, they can be used to determine the substance portion 450a of the foreground object 450 in the image $I_{35}$, wherein the portion of the foreground object 450 located between the boundary lines $B_1$ and $B_2$ is the substance portion 450a.

In this embodiment, because the portion determined by the shadow filtering step 432 is substantially equal to the substance portion 450a of the foreground object, in the motion detection method 400, the shadow of the foreground object can be filtered off to prevent the accuracy of the surveillance system from being affected by the shadow of the foreground object.

In addition, a size filtering step used to identify objects based on the size of each the objects can be performed after the shadow filtering step 432. For example, in a size filtering step for identifying cars, at first, the width and the length of the object 450 are respectively calculated and compared with a predetermined width and a predetermined length. The predetermined width and length are determined according to a car image pre-captured by the surveillance system. If the calculated width and length of the object 450 are respectively equal to the predetermined width and length, the object 450 is determined as a car. In contrast, if one of the two conditions is not satisfied, the aspect ratio of the object 450 is then calculated and compared with a predetermined aspect ratio calculated according to the predetermined width and the predetermined length. If the aspect ratio of the object 450 is equal to the predetermined aspect ratio, the object 450 is determined as a car.

Figure 10:
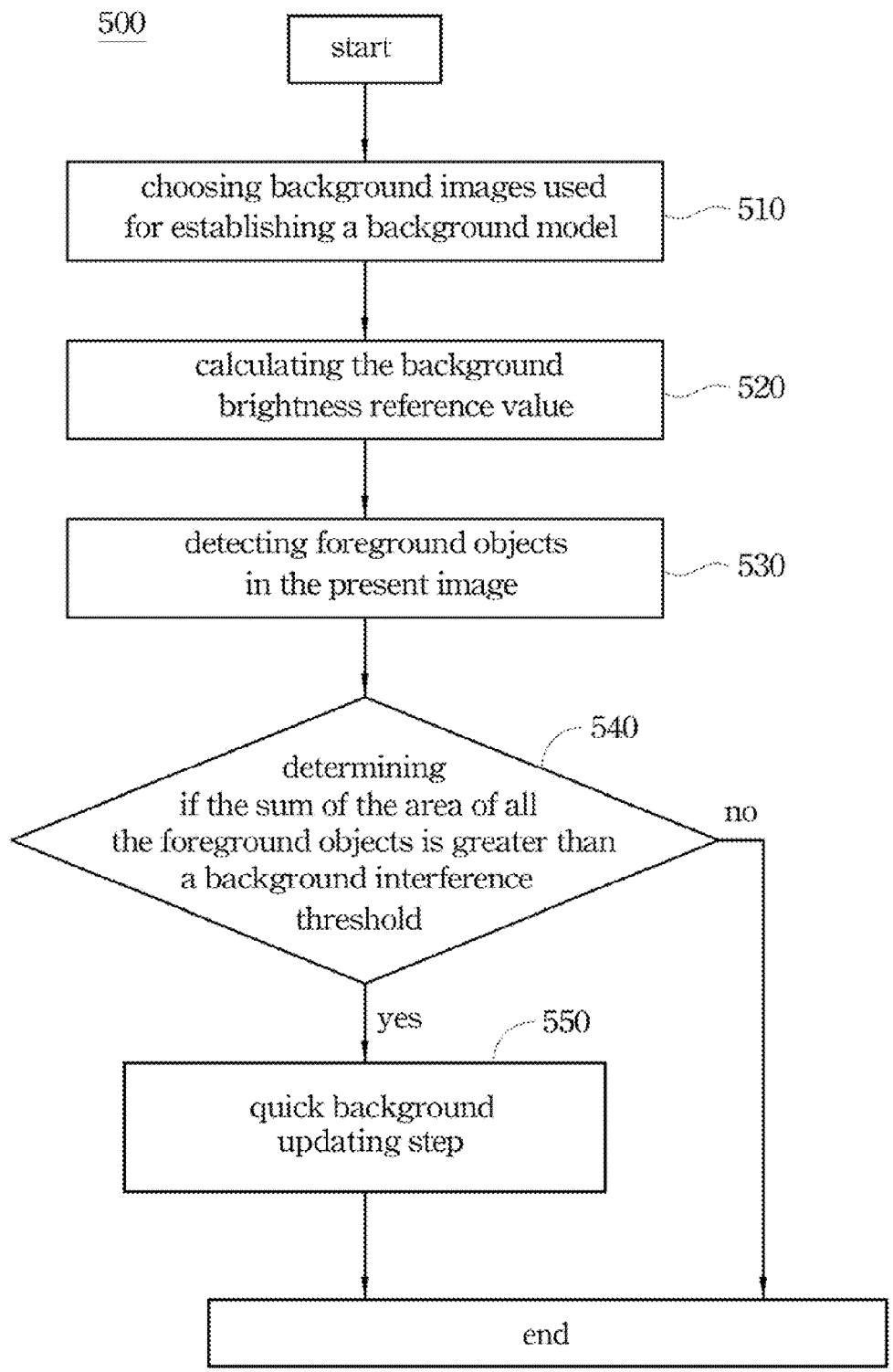
FIG. 10 is a flow chart showing a motion detection method according to an embodiment of the present invention.
Figure 11:
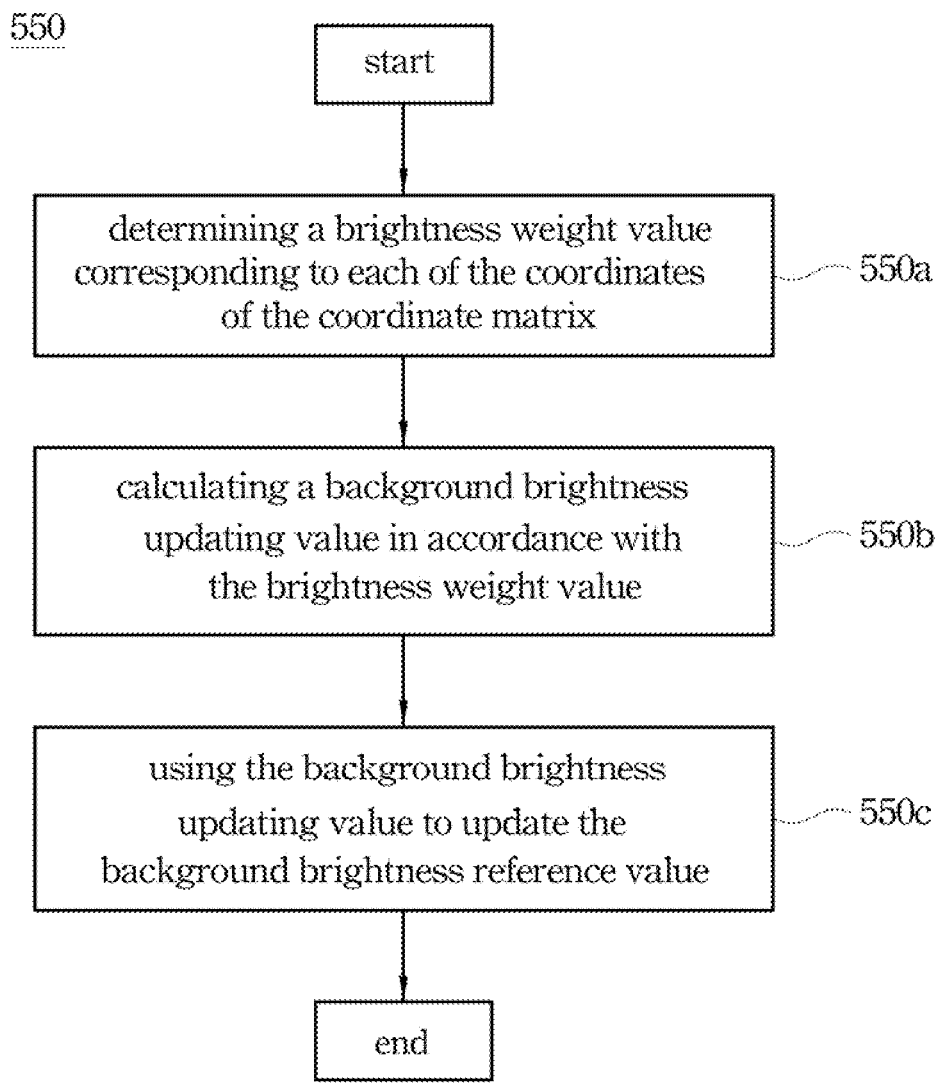
FIG. 11 is a flow chart showing a quick updating step of the motion detection method.

In the size filtering step, the precision of the size calculated would greatly affect the performance of the size filtering step. Therefore, because the shadow filtering step 432 can easily filter off the shadow of the object, the accuracy of the size filtering step can be improved by performing the size filtering step after the shadow filtering step 432, Refer to FIG. 10 and FIG. 11. FIG. 10 is a flow chart showing a motion detection method 500 according to an embodiment of the present invention. FIG. 11 is a flow chart showing a quick updating step 550 of the motion detection method 500. In the motion detection method 500, a step 510 is firstly performed to choose background images used for establishing a background model. Then, a background model establishing step 520 is performed to calculate the background brightness reference value corresponding to each of the coordinates of the background model. Thereafter, the foreground object detection step 530 is performed to detect foreground objects in the present image $I_{31}$. Thereafter, a step 540 is performed to determine if the sum of the area of all the foreground objects is greater than a background interference threshold. In this embodiment, the background interference threshold is set to represent 50% of the area of the image $I_{31}$. Thereafter, when the sum of the area of all the foreground objects is greater than the background interference threshold, a quick background updating step 550 is performed to update the foreground brightness reference values of the background model to the brightness of the pixels on corresponding coordinates of the present image $I_{31}$.

In this embodiment, when the sum of the area of all the foreground objects is greater than 50% area of the present image $I_{31}$, it means the environment brightness of the surveillance area is greatly changed. For example, the lighting equipment is turned on or off, or the camera lens of the surveillance system is shaken or covered. Thus, a quick background updating step 550 is performed to quickly update the background model to enable the surveillance system to determine the foreground objects more accurately.

In the quick background updating step 550, a step 550a is firstly performed to determine brightness weight values W". Each of the brightness weight values W" corresponds to one coordinate point of the coordinate matrix 15. In this embodiment, for the pixel Px of the present image, the brightness weight value W" corresponds to the Px is determined by the brightness of the pixel Px. The brightness weight value W' is increased with the increasing of the brightness of the pixel Px. In addition, the determination method used to determine the brightness weight value W can also be used to determine the brightness weight value W". Thereafter, a step 550b is performed to calculate a background brightness updating value in accordance with the brightness weight value W". In this embodiment, the brightness weight value W" is multiplied by the background reference value corresponding to the pixel Px to obtain a background brightness proportion value. Then, a difference between 1 and the brightness weight value W" is multiplied by the brightness of the pixel Px to obtain a foreground brightness proportion value. Thereafter, the background brightness proportion value and the foreground brightness proportion value are summed up to obtain the background brightness updating value. Thereafter, a step 550c is performed to use the background brightness updating value to update the background brightness reference value corresponding to the pixel Px.

It is noted that, in this embodiment, the brightness weight value W" is substantially smaller than or equal to 0.5 and greater than 0, so that the variation of the background model is great enough to quickly update the background model.

Figure 12:
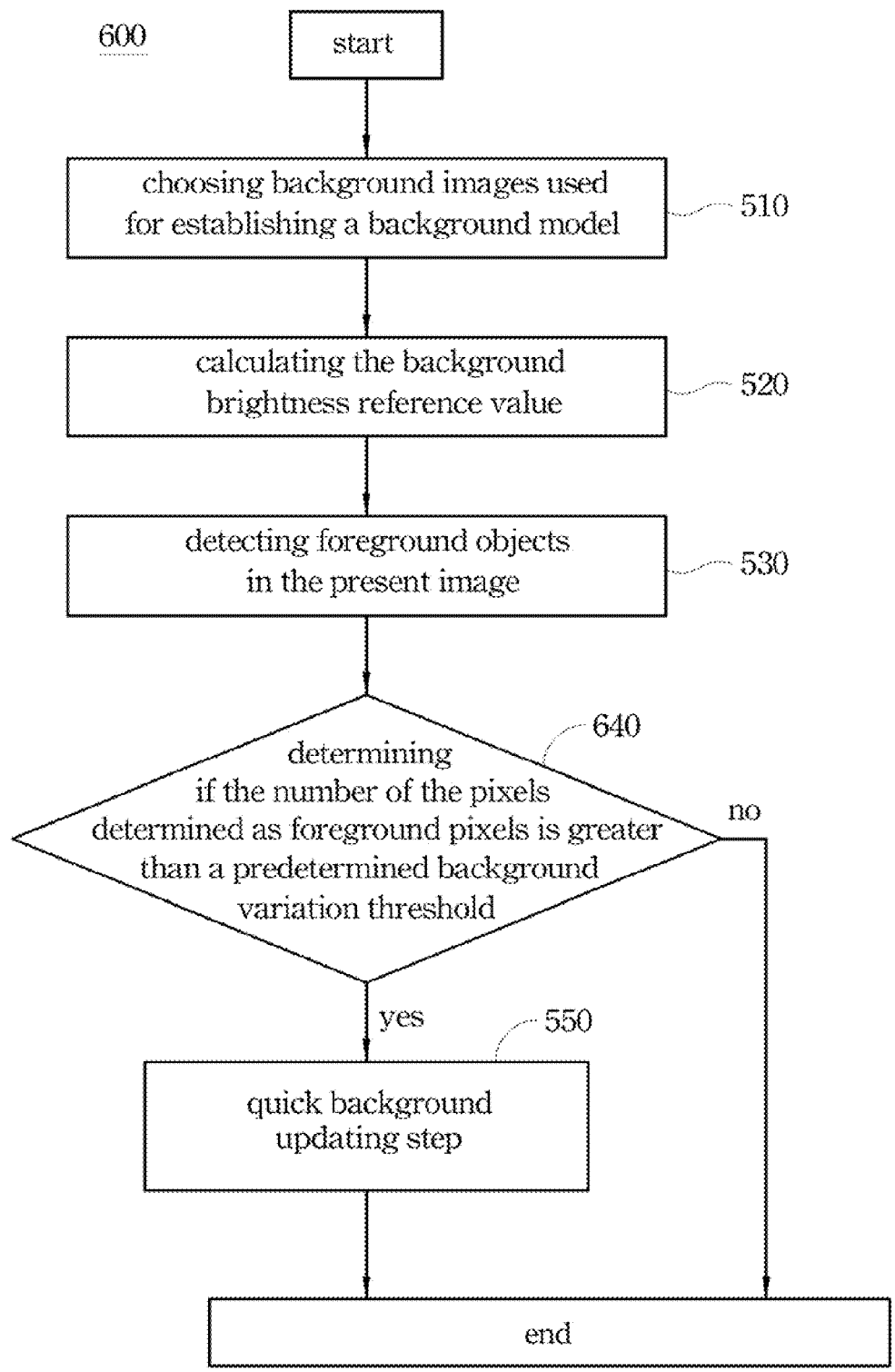
FIG. 12 is a flow chart showing a motion detection method according to an embodiment of the present invention.

Refer to FIG. 12. FIG. 12 is a flow chart showing a motion detection method 600 according to an embodiment of the present invention. The motion detection method 600 is similar to the motion detection method 500, but the difference is in that a step 640 is instead of the step 540. In the step 640, it is determined that if the number of the pixels determined as foreground pixels is greater than a predetermined background variation threshold. In this embodiment, the background variation threshold is set to half number of all pixels of the present image. Thereafter, when the number of the pixels determined as foreground pixels is greater than a predetermined background variation threshold, the step 550 is performed to update performed to update the foreground brightness reference values of the background model to the brightness of the pixels on corresponding coordinates of the present image.

In this embodiment, the motion detection method 600 uses the number of the foreground pixels to determine if the environment brightness of the surveillance area changes, and perform quick updating accordingly. The advantage of using the number of the foreground pixels to determine when to update the background model is that the step 640 can be performed before the morphological processing step, so that it is not necessary to wait for the conversion of the foreground pixels. For example, after the pixels are determined as foreground pixels, the number of the foreground pixels is record, thus it can be determined that if the quick updating is performed.

According to the aforementioned, motion detection method 500 and 600 can be use to quickly update the background model when the brightness of the surveillance area greatly changes. Therefore, the surveillance system adopts the motion detection method 500 or 600 can be more accurate in determining if something happens in the surveillance area.

In addition, a warning step can be performed after the step 540 or 640 to show the camera is occluded, shaken or moved, or the brightness of the surveillance area is greatly changed, and blind detection, sudden lighting change detection and scene change detection are thereby performed.

It is noted that the foregoing motion detection method 100, 300, 400, 500, and 600 can be embodied as computer-readable medium. After reading the medium, a computer can perform the motion detection method 100, 300, 400, 500, or 600.

As is understood by a person skilled in the art, the foregoing embodiments of the present invention are strengths of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A motion object detection method using an adaptive background model to detect a foreground object in a present image in accordance with at least one background image, wherein the present image and the background images are corresponding to the same pixel coordinate array comprising a plurality of pixel coordinates points, and the motion object detection method comprises:
    performing a background model establishing step comprising:
        determining a plurality of first brightness weight values in accordance with the brightness of a plurality of background pixels of the background image, wherein each of the first brightness weight values corresponds to a background pixel, and each of the first brightness weight values is determined by the brightness of the corresponding background pixel, and the first brightness weight values increases with the increase of the brightness of the corresponding background pixel; and
        calculating a plurality of background brightness reference values in accordance with the brightness of the background pixels and the first brightness weight values, wherein each of the background brightness reference values corresponds to a pixel coordinates point, and each of the brightness of the background pixels is multiplied by the brightness weight value corresponding thereto to obtain the background brightness reference values; and
    detecting at least one foreground object by using the background brightness reference values.

2. The method of claim 1, wherein the step for calculating the background brightness reference values comprises:
    multiplying the brightness of each of the background pixels by the first brightness weight value corresponding thereto to obtain a plurality of weighted brightness corresponding to the background pixels;
    dividing the weighted brightness into a plurality of brightness groups in accordance with the pixel coordinates points, wherein each of the brightness groups corresponds to a pixel coordinates point; and calculating the average of each of the brightness groups to obtain a plurality of weighted average brightness, wherein each of the weighted average brightness corresponds to a pixel coordinates point, and the weighted average brightness are the background brightness reference value.

3. The method of claim 1, wherein the step for calculating the background brightness reference values comprises:

multiplying the brightness of each of the background pixels by the first brightness weight value corresponding thereto to obtain a plurality of weighted brightness corresponding to the background pixels;

dividing the weighted brightness into a plurality of brightness groups in accordance with the pixel coordinates points, wherein each of the brightness groups corresponds to a pixel coordinates point; and calculating the median of each of the brightness groups to obtain a plurality of weighted median brightness, wherein each of the weighted median brightness corresponds to a pixel coordinates point, and the weighted median brightness are the background brightness reference value.

4. The method of claim 1, wherein each of the first brightness weight values is in proportion to the brightness of the background pixel corresponding thereto.

5. The method of claim 1, wherein the step for detecting the foreground objects comprises:

determining if a plurality of pixels of the present image are foreground pixels, wherein the step for determining if the pixels are foreground pixels comprises:

calculating a difference between the brightness of the pixel of the present image and the background brightness reference value corresponding thereto;

providing a brightness varying threshold, wherein the brightness varying threshold increases with the increase of the brightness of the pixel of the present image;

determining if the difference is smaller than the brightness varying threshold to provide a result;

changing the value of an accumulated stay times in accordance with the result;

determining if the value of the accumulated stay times is greater than or equal to a stay times threshold; and determining the pixel of the present image as a foreground pixel, when the accumulated stay times is greater than or equal to the stay times threshold; and converting the pixels determined as foreground pixels to at least one foreground object.

6. The method of claim 5, further comprising:

projecting the foreground object on a horizontal coordinate axis to obtain a pixels distribution curve, wherein the pixels distribution curve represent a relation between horizontal positions of the pixels of the foreground object and pixel numbers corresponding to the horizontal positions, and the horizontal coordinate axis represents the horizontal positions of the pixels of the foreground object;

calculating a vertical distance between a maximum value point and the horizontal coordinate axis, wherein the maximum value point belongs to the pixels distribution curve and has a maximum pixel number value in the points of the pixels distribution curve;

providing an object substance proportion threshold;

determining a horizontal cut line in accordance with the object substance proportion threshold and the vertical distance, wherein the intercepts the pixels distribution curve at the two interception points;

determining two vertical boundary lines in accordance with the two interception points; and determining a substance portion of the foreground object in accordance with the two vertical boundary lines.

7. The method of claim 1, further comprising:

calculating a difference between the brightness of a pixel of the present image and the background brightness reference value corresponding thereto;

providing a brightness varying threshold, wherein the brightness varying threshold increases with the increase of the brightness of the pixel of the present image;

determining if the difference is smaller than the brightness varying threshold to provide a result;

changing the value of an accumulated stay times in accordance with the result;

determining if the value of the accumulated stay times is greater than or equal to a stay times threshold; and updating the value of the background brightness reference value corresponding to the pixel in accordance with the brightness of the pixel, when the value of the accumulated stay times is greater than or equal to the stay times threshold.

8. The method of claim 7, wherein the step for updating the value of the background brightness reference value comprises:

determining a second brightness weight value in accordance with the pixel of the present image;

multiplying the background brightness reference value corresponding to the pixel by the second weight value to obtain a background brightness proportion value;

multiplying a difference between 1 and the second brightness weight value by the brightness of the pixel to obtain a foreground brightness proportion value; and updating the background brightness reference value corresponding to the pixel to the sum of the foreground brightness proportion value and the background brightness proportion value.

9. The method of claim 8, wherein the second brightness weight value is substantially greater than 0.5 and smaller than 1.

10. The method of claim 5, wherein the value of the accumulated stay times is increased when the result is true, and the value of the accumulated stay times is decreased when the result is false.

11. The method of claim 5, further comprising determining if the area of the at least one foreground object is greater than a background interference threshold;

performing a quick back ground updating step when the area of the at least one foreground object is greater than a background interference threshold, wherein the quick updating step comprises;

determining a second brightness weight value in accordance with the brightness of the pixel of the present image;

multiplying the background brightness reference value corresponding to the pixel by the second brightness weight value to obtain a background brightness proportion value;

multiplying a difference between 1 and the second brightness weight value by the brightness of the pixel to obtain a foreground brightness proportion value; and updating the background brightness reference value corresponding to the pixel to the sum of the foreground brightness proportion value and the background brightness proportion value.

12. The method of claim 11, wherein the second brightness weight value is substantially smaller than 0.5 and greater than 0.

13. The method of claim 5, further comprising:
determining if the number of the pixels determined as foreground pixels is greater than a background varying threshold;
performing a quick background updating step, when the number of the pixels determined as foreground pixels is greater than a background varying threshold, wherein the quick background updating step comprises:
determining a second brightness weight value in accordance with the brightness of the pixel of the present image;
multiplying the background brightness reference value corresponding to the pixel by the second brightness weight value to obtain a background brightness proportion value;
multiplying a difference between 1 and the second brightness weight value by the brightness of the pixel to obtain a foreground brightness proportion value; and
updating the background brightness reference value corresponding to the pixel to the sum of the foreground brightness proportion value and the background brightness proportion value.

14. The method of claim 13, wherein the second brightness weight value is substantially smaller than 0.5 and greater than 0.

15. A motion object detection method using an adaptive background model to detect a foreground object in a present image in accordance with at least one background image, wherein the motion object detection method comprises:
establishing a background model in accordance with at least one background image, wherein the background model comprises a plurality of background brightness reference values;
determining if a plurality of pixels of the present image are foreground pixels in accordance with the background model;
detecting at least one foreground object in the present image in accordance with the pixels determined as foreground pixels;
calculating an area of the at least one foreground object;
determining if the area of the at least one foreground object is greater than a background interference threshold;
performing a quick background updating step to update each of the background brightness reference values when the area of the at least one foreground object is greater than a background interference threshold, wherein the quick background updating step comprises:
determining a brightness weight value in accordance with the brightness of the pixel of the present image;
multiplying the background brightness reference value corresponding to the pixel by the brightness weight value to obtain a background brightness proportion value;
multiplying a difference between 1 and the brightness weight value by the brightness of the pixel to obtain a foreground brightness proportion value; and
updating the background brightness reference value corresponding to the pixel to the sum of the foreground brightness proportion value and the background brightness proportion value.

16. The method of claim 13, wherein the brightness weight value is substantially smaller than 0.5 and greater than 0.

17. A motion object detection method using an adaptive background model to detect a foreground object in a present image in accordance with at least one background image, wherein the motion object detection method comprises:
establishing a background model in accordance with at least one background image, wherein the background model comprises a plurality of background brightness reference values;
determining if a plurality of pixels of the present image are foreground pixels in accordance with the background model;
calculating a number of the pixels determined as foreground pixels;
determining if the number of the pixels determined as foreground pixels is greater than a background varying threshold;
performing a quick background updating step to update each of the background brightness reference values when the number of the pixels determined as foreground pixels is greater than a background varying threshold, wherein the quick background updating step comprises:
determining a brightness weight value in accordance with the brightness of the pixel of the present image;
multiplying the background brightness reference value corresponding to the pixel by the brightness weight value to obtain a background brightness proportion value;
multiplying a difference between 1 and the brightness weight value by the brightness of the pixel to obtain a foreground brightness proportion value; and
updating the background brightness reference value corresponding to the pixel to the sum of the foreground brightness proportion value and the background brightness proportion value.

18. The method of claim 17, wherein the brightness weight value is substantially smaller than 1 and greater than 0.5.

19. A motion object detection, method using an adaptive background model to detect a foreground object in a present image in accordance with at least one background image, wherein the motion object detection method comprises: performing a background model establishing step to use the at least one background images to establish a background model, wherein the background model comprises a plurality of background brightness reference value; determining if a plurality; of pixels of the present image are foreground pixels; detecting at least one foreground pixies in the present image in accordance with the pixels determined as foreground pixels; and performing a shadow filtering step to filter off the shadow of the foreground object, wherein the shadow filtering step comprising:
projecting the foreground object on a horizontal coordinate axis to obtain a pixels distribution curve wherein the pixels distribution curve represent a relation between horizontal positions of the pixels of the foreground object and pixel numbers corresponding to the horizontal positions and the horizontal coordinate axis represents the horizontal positions of the pixels of the foreground object;
calculating a vertical distance between a maximum value point and the horizontal coordinate axis, wherein the maximum value point belongs to the pixels distribution curve and has a maximum pixel number value in the points of the pixels distribution curve;
providing an object substance proportion threshold;
determining a horizontal cut line in accordance with the object substance proportion threshold and the vertical distance wherein the horizontal cut line intercepts the pixel distribution curve at two interception points determining two vertical boundary lines in accordance with the two interception points; and determining a substance portion of the foreground object in accordance with the two vertical boundary lines.

20. A non-transitory computer-readable storage medium having a program product for causing a computer to automatically perform the method of claim 1.

* * * * *